US006876858B1

United States Patent
Duvall et al.

(10) Patent No.: US 6,876,858 B1
(45) Date of Patent: Apr. 5, 2005

(54) METHODS OF AND SYSTEM FOR PORTABLE CELLULAR PHONE VOICE COMMUNICATION AND POSITIONAL LOCATION DATA COMMUNICATION USING THE CELLULAR PHONE NETWORK CONTROL CHANNEL

(75) Inventors: William Duvall, Sudbury, MA (US); Rod DeMille, Sudbury, MA (US)

(73) Assignee: LoJack Operating Company, LP, Westwood, MA (US)

( * ) Notice: Subject to any disclaimer, the term of this patent is extended or adjusted under 35 U.S.C. 154(b) by 0 days.

(21) Appl. No.: 09/235,606

(22) Filed: Jan. 20, 1999

(51) Int. Cl.[7] .............................................. H04Q 7/20
(52) U.S. Cl. .............................. 455/456.1; 455/404.1; 455/456.2; 455/456.3; 340/426.19
(58) Field of Search ...................... 455/456.1, 456.2, 455/404.2, 414.2, 557, 434, 403, 424, 404.1, 457, 511, 509, 575.1, 550.1, 456, 575, 552, 404, 414, 550, 374, 402.1, 414.1, 414.3; 340/426.19, 426.2, 426.22, 426.13, 426.16, 426.5, 357, 426; 342/357.12, 357; 379/200, 199, 144, 245, 51, 58

(56) References Cited

U.S. PATENT DOCUMENTS

| 5,515,419 | A | * | 5/1996 | Sheffer ........................ 379/58 |
| 5,587,715 | A | * | 12/1996 | Lewis ........................ 342/357 |
| 5,874,889 | A | * | 2/1999 | Higson et al. .............. 340/426 |
| 5,890,061 | A | * | 3/1999 | Timm et al. ................ 455/404 |
| 5,960,337 | A | * | 9/1999 | Brewster et al. ............ 455/404 |
| 5,986,543 | A | * | 11/1999 | Johnson ..................... 340/426 |
| 6,032,054 | A | * | 2/2000 | Schwinke ................... 455/557 |
| 6,049,718 | A | * | 4/2000 | Stewart ...................... 455/456 |
| 6,091,956 | A | * | 7/2000 | Hollenberg ................. 455/456 |

\* cited by examiner

Primary Examiner—Edward F. Urban
Assistant Examiner—Charles Chow
(74) Attorney, Agent, or Firm—Iandiorio & Teska

(57) ABSTRACT

A novel method of and system for enabling the use of one portable cellular phone only, in voice communication with a cellular network control center for voice-requesting position or location data services, and, with the aid of a vehicle GPS-transponder activated in response to signaling from the control center over cellular network channel control paths, to receive and process at the vehicle GPS location data from satellites, and to transmit the data over the said channel control paths to the control center, for then sending therefrom to the user of the portable cellular phone.

15 Claims, 2 Drawing Sheets

Figure 1:
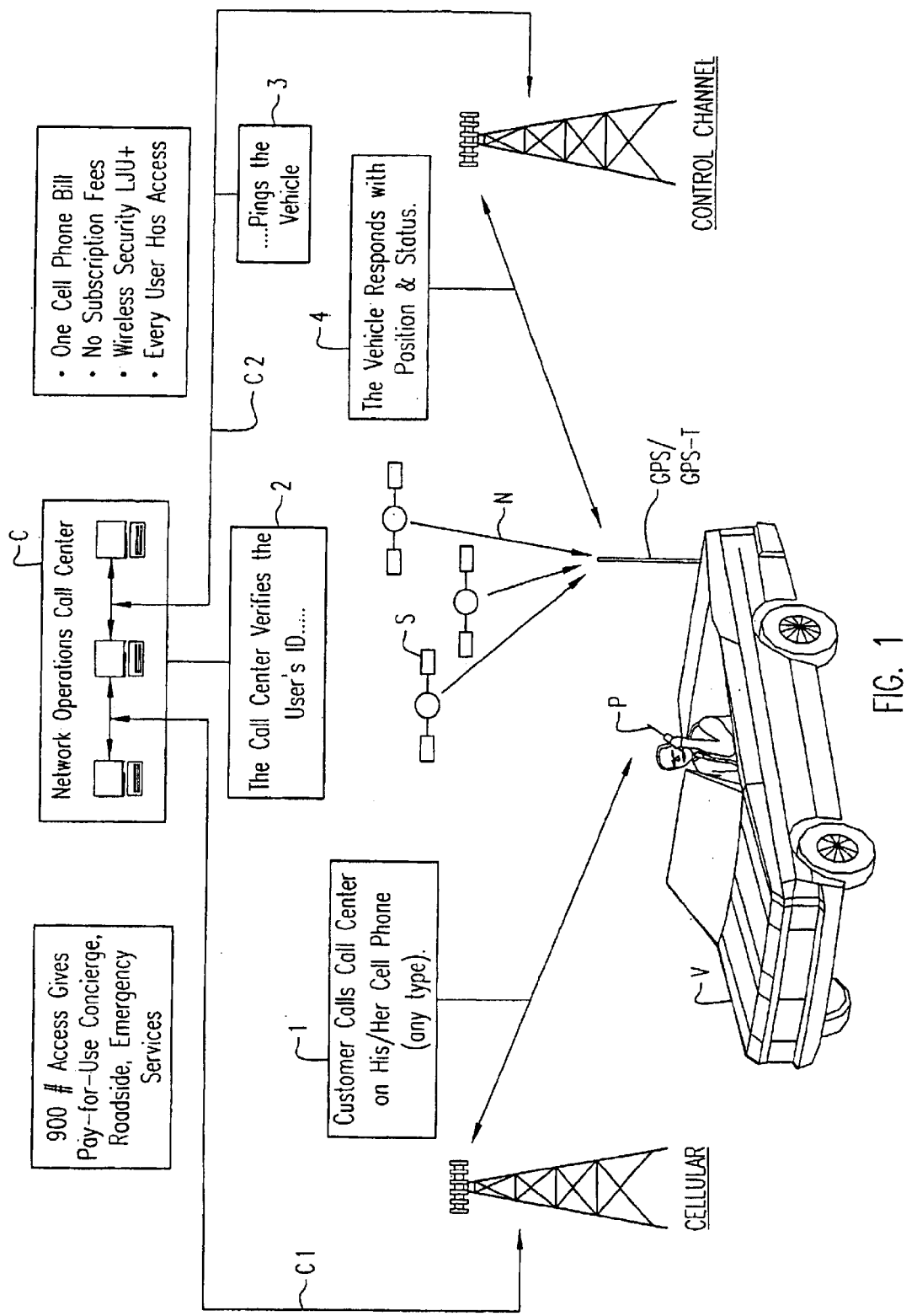

METHODS OF AND SYSTEM FOR PORTABLE CELLULAR PHONE VOICE COMMUNICATION AND POSITIONAL LOCATION DATA COMMUNICATION USING THE CELLULAR PHONE NETWORK CONTROL CHANNEL

The present invention relates to cellular telephone voice communication and positional location data communication; being more particularly, though not exclusively, concerned with vehicle communication equipment using cellular phones and provided with a GPS input, wherein the driver can call a central service center to receive directions or safety or security services, navigational aid and other services.

BACKGROUND

In the recent past, vehicular equipment has been provided to enable the reception by the driver of positional location services through a combined voice and data cellular phone equipped with a GPS receiver input, enabling the driver to call a central service center over a personal cellular phone to provide directions, safety services or security services to the driver of the vehicle. Among such products are "Onster" by General Motors, the Ford "Rescu", and Media Management's "Caring", among others. The current industry requires the owner of the car to pay a hardware fee for a vehicular telephone-GPS equipment, an activation fee for this second phone, a recurring monthly fee (which varies from $20–$25.00), and, additionally, a fee for usage, such as paying for the call by the minute or the service. These numerous required fees have disadvantageously mitigated against the anticipated, but not as yet currently attained, commercial success hoped for in these products. The aftermarket also has been offering a combined voice and data cellular phone with a GPS module to accomplish these services in the same manner.

In accordance with the novel concepts of the present invention, on the other hand, through a novel separation of voice and data aspects of the equipment and services, the inhibiting charges and costs underlying present-day offerings are eliminated, and a breakthrough, promising much wider acceptance of this technology, now appears in the offing.

OBJECTS OF INVENTION

An object of the present invention, accordingly, is to provide a new and improved method of and system for portable cellular phone voice communication and positional location data communications, that shall not be subject to the prior art disadvantages above discussed, but that, to the contrary, through a novel separation of voice and data aspects of the equipment and services, promises improved performance with substantially lower costs.

Other and further objects will be explained hereinafter and are more particularly delineated in the appended claims.

SUMMARY

In summary, from one of its broader aspects, the invention embraces a method of voice and positional location data radio communication over a cellular phone network having cellular radio voice and control channel paths separately communicating with a network operations control center, that comprises, user voice-calling the control center from a portable cellular telephone location over the cellular voice path, requesting location information services; upon user verification, sending a radio signal from the control center over the control channel path to be received at said location, providing a radio transponder and GPS receiver and microprocessor module at said location; activating the GPS receiver in response to receipt of said signal, to receive and process location data from the GPS satellite constellation and to activate the transponder to transmit processed location data over the control channel path to said control center; associating the transmitted location data with the user voice call request at the control center, and sending location service information from the control center to the user.

Preferred and best mode designs and operation are later described.

DRAWINGS

Figure 2:
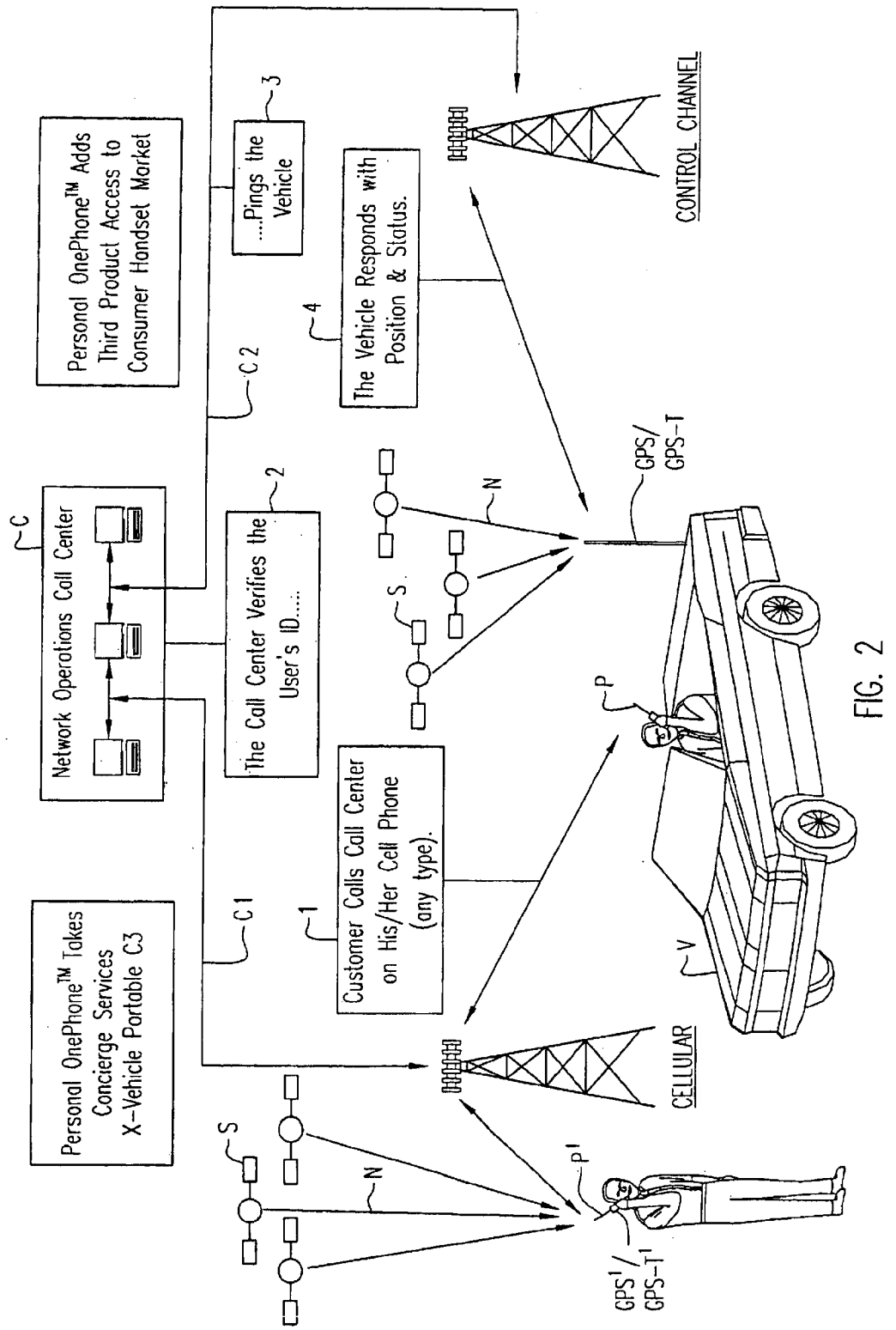

The invention will now be explained in connection with the accompanying drawings, FIG. 1 of which is a schematic diagram of the techniques and system of the invention adapted for vehicular use and in preferred form, and FIG. 2 is a similar diagram including pedestrian or personal portability.

PREFERRED EMBODIMENT(S) OF INVENTION

As earlier mentioned, a major difference between what is currently used in the industry and the concept underlying the present invention involves the separation of the data and the voice aspects of the service. The user still makes voice calls over the radio voice path to the call center, with the user's own existing portable cellular phone. A separate vehicle module is provided which uses a vehicle—provided data transmitter-receiver portion of the vehicle module (not a full voice and data phone as presently required), transmitting the GPS and other data back along the control channel path of the cellular voice phone network. This is as contrasted with the present whole vehicle cellular telephone voice and data phone (and its further costs before discussed), built in as a requirement for the proper operation of the system. The invention, rather, relies on the user's portable phone for voice, and not the dedicated in-car vehicle phone control channel radio, which is confined or restricted to data transmission only, and along the cellular phone network control channel only. This means there is no longer the need for the customer to have a second phone bill, additional to the user's portable phone, in light of the use of the no-charge (or minimal fee) cellular network control channel path for positional data only.

In cellular phone network coverage areas, each AMPS (advance mobile phone standard) cell site generically has one to three control channels that serve to alert the network of a user's presence so that the user may be located. The control channels set up calls, break down calls and switch cell sites. Although these control channels are necessary to enable voice operation, they remain otherwise unused for most of the time. While it has before been proposed in Aeries "MicroBurst" technology and in Bell South's "Cellemetry" to provide low data rate communication over such cellular control channels, the present invention uses the same for a different purpose and in a very different system operation.

The invention only requires the paying of the recurring monthly fee for the user's existing portable phone, and there may be no further recurring fees for the vehicle module which, in accordance with the invention, communicates only over the control channel of the cellular network and only to transmit data.

Turning now, to the embodiment shown in FIG. 1, the customer in the vehicle V is shown calling at 1 on any type of existing cellular phone P, presumably one that the driver already owns, to the network operations call center, so labeled at C. The center receives the cellular phone call at the appropriate network antenna ("CELLULAR") over the normal voice cellular phone channel C1, and, in usual fashion, verifies that the caller's user ID is correct, often by requesting a PIN code at 2, as is well known. Then the call center C separately and independently, using the PIN code, looks up the appropriate control channel access number, and sends or "pings" a radio query at 3, along path C2 and the channel control transmitter antenna ("CHANNEL CONTROL"), to a control channel transponder-GPS receiver module, GPS-T, provided in the vehicle V. The receipt of the radio signal "ping" 3 by the vehicle module, wakes up or activates the GPS receiver ("GPS") therein and calculates by its microprocessor, the vehicle position 25 determined by receiving the navigation signals N from the GPS satellite constellation S. The vehicle module transponder transmitter portion T is then activated to respond back at 4 to the CONTROL CHANNEL path and through the control channel $C_2$, with the vehicle position location data information and any other data information which may be selected for sending along the control path $C_2$, back to the network operations call center C. The center can now inform the caller where the vehicle is currently located, thereby enabling driver planning and executing of vehicle routes, and/or providing other services. By associating this information received along the control channel with the appropriate user voice call request received along the cellular phone channel C1, the control center C then communicates the requested positional or other service information back to the user in the vehicle V.

Turning to FIG. 2, the same operations of the system of FIG. 1 are shown provided, supplemented, however, by the facility for pedestrian or other personal use of the system by the user's portable cell phone $P^1$, equipped with its own $GPS^1$-$T^1$ module.

In addition to the novel idea of separating voice and data channels to accomplish cost economy, the invention also lends itself to the reduction of the hardware cost. The vehicle modules that are currently available from the before-mentioned companies offering "Onster" and "Rescu", and those in the after-market, are relatively large, power-hungry and very expensive. Under the operation of this invention, to the contrary, the need is eliminated for the current full blown voice and data typical vehicular cellular phone with its microphone, speaker, dialer, display and case, batteries and charger, and so forth. The only function of such vehicle cellular phone used in accordance with the data communication along the cellular network control channel with the present invention is just the 900 meghertz radio transmitter. The integration of just the control channel transponder-GPS-receiver and microprocessor technologies as the vehicle module, thus provides a significant improvement and substantial cost reduction. Even in the absence of such special chip integration or miniaturization, conventional modules can be readily assembled to practice the invention. A standard communications model CMM 8600 Microburst™, for example, is a typical cellular radio telephone unit, and manufacturers providing hardware components for the purpose of operating on the cellular phone network control channel include Standard Radio and Standard Communications of Japan (providing radio equipment for the Aries "MicroBurst" protocol). Erickson and Wireless Link also currently provide appropriate radio transceivers.

As an extended feature of the invention, and an additional use of the transponder T and the channel control facility $C_2$ otherwise used for the invention, even in the absence of the driver and the portable cellular phone P, the vehicle may be made self-monitoring against being broken into or hot wired or towed or otherwise disturbed, through the addition of vehicle-movement and related sensors, as disclosed in applicant's co-pending application Ser. No. 873,851 originally filed Apr. 12, 1995 for Improved Vehicle Tracking Transponder System and Transponding Method. The activation of such sensor(s), schematically illustrated as $S^1$ in FIG. 1, may intelligently wake up the control channel transceiver T, which would then send back the GPS code and identification to the network operations center C, independently of the use of the voice cellular phone of FIG. 1. The call center would detect this as an alarm condition and would call the owner of the vehicle. This is important because, with current-day vehicle telephones embedded with GPS receivers, if there is no one in the car to receive the verification phone call from the center, or even worse, if a thief is in the car to receive this phone call, it would not be possible correctly to determine the status of the alarm. With the present invention, however, the cellular phone which is a portable phone which the customers have with them, or some other pre-designated phone, so that even if the customers are far removed from the vehicle, they would still receive the notification of an alarm from the center.

In the before-mentioned earlier co-pending application, the sensor on the vehicle, when activated, triggered the same vehicle transponder that was normally used in the type of vehicle recovery system currently marketed by the LoJack Corporation and described in U.S. Pat. Nos. 4,818,998 and 4,908,629, to permit tracking by alerted police vehicles on pre-assigned frequencies. In such vehicle tracking, the transponder or transceiver in the stolen or missing vehicle enables the vehicle to be located and/or tracked by appropriately equipped police direction-finding tracking vehicle through homing-in on periodic transponder reply radio transmissions automatically activated by command activation signals broadcast on the same carrier frequency as the transponder reply signals, and with encoded vehicle identification information that causes the intended vehicle transponder so to reply, as explained in these patents. The system also had provision for modifying the command signals to require an increased rate of periodic transponder reply signal transmission to assist homing-in on the selected vehicle. In a preferred mode of operation, the verification of whether the reportedly missing vehicle is thus transponder-equipped is preferably established by querying the FBI-NCIC computer system, which will provide the said coded vehicle identification information and automatically cause the appropriate sector or area to broadcast said command activation signals. The tracking vehicle, in accordance with a feature of the present invention, may also be alerted and/or supplied with the GPS location data as to a vehicle that is being unauthorizedly tampered with or moved and being tracked, further aiding in the recovery of the stolen vehicle. In one version, for example, a pre-designated phone, such as P in FIG. 1, may be disposed in, or in communication with, the "LoJack" police or other tracking vehicle (V), for receiving this supplementary location information from the control center.

Further modifications will also occur to those skilled in this art, and such are considered to fall within the spirit and scope of the invention as defined in the appended claims.

What is claimed is:

1. A method of voice and GPS satellite constellation positional location data radio communication over a cellular phone network having a cellular network radio voice-communication path and a cellular network different data communications radio control channel path normally used to set up phone calls, break down phone calls and switch cell sites, each separately communicating along their respective different paths with a network operations control center, that comprises, user initial voice-calling of the control center from a portable cellular telephone location and over the cellular network radio voice-communication path requesting user-location information services of the control center; upon user verification, sending a radio wake-up signal from the control center over the cellular network data-communication radio control channel path to be received at said location, providing a radio transponder and a GPS receiver adapted to receive GPS satellite constellation location data transmission frequency and a microprocessor module at said user location; activating the GPS receiver in response to receipt of said wake-up radio signal sent from the cellular network control center over its data-communication radio control channel path, to receive and microprocessor-process the location data received by the GPS receiver from the GPS satellite constellation at the user location and thereupon to activate the transponder at said user location to transmit the microprocessor-processed received location data over the cellular network data-communication radio control channel path back to said control center, associating at the control center, the transmitted user-location data received over the cellular network data-communication radio control channel path by the control center with the initial user voice call request received along the cellular network radio voice-communication path at the control center, and sending the requested user-location services information from the control center to the user.

2. The method of claim 1 where said user location is in a vehicle, and the said module is provided in the vehicle.

3. The method of claim 2 wherein the vehicle is further provided with movement/tampering alarm sensing; and, in response to such sensing, and apart from the presence or absence of the user at the vehicle, activating the vehicle GPS-transponder module to receive and process GPS location data for the vehicle and to transmit the data with vehicle user identification as an alarm over the cellular network control channel path back to said control center; associating the transmitted location alarm received at the cellular network control center with a phone pre-designated by the vehicle user and calling the alarm from the control center to that phone.

4. The method of claim 1 wherein said user is a pedestrian or is located at another personal user location at which the user is provided with a personal cellular phone and said module.

5. The method of claim 1 wherein said associating of location data received over the cellular network control channel path with the voice call received over the cellular network voice-communication path is effected by PIN information at the control center.

6. A system for voice and positional location data radio communication over a cellular phone network having a cellular network radio voice-communication path and a cellular network different data-communication radio control channel path normally used to set up phone calls, break down phone calls and switch cell sites, separately communicating along their respective different paths with a network operations control center, the system having, in combination, a portable cellular telephone for initial user voice-calling to the control center over the cellular network radio voice-communication path for requesting user-location information services of the control center; means operable upon user identification, for sending a radio wake-up signal from the control center over the cellular network data-communication radio control channel path to be received at the user location; a radio-transponder and a GPS receiver adapted to receive GPS satellite constellation location data transmission frequency and a microprocessor module disposed at said user location; means for activating the GPS receiver of the module in response to receipt of said radio wake-up signal sent from the cellular network control center over its data-communication radio control channel path, to receive and to microprocessor-process the location data received by the GPS receiver from the GPS satellite constellation at the vehicle and thereupon to activate the transponder at the vehicle to transmit the microprocessor-processed location data over the cellular network data communication radio control channel path back to said control center; and means for sending location services information from the control center to the user upon associating at the control center the transmitted user-location data received over the cellular network data-communication radio control channel path by the control center with the initial user voice call request received along the cellular network radio voice-communication path by the control center.

7. The system of claim 6 wherein said user location is in a vehicle, and the said module is provided in the vehicle.

8. The system of claim 7 wherein the vehicle is further provided with movement/tampering alarm sensing means; and means operable in response to such sensing, and apart from the presence or absence of the user at the vehicle, for activating the vehicle GPS-transponder module to receive and process GPS location data for the vehicle and to transmit the data with vehicle user identification as an alarm along the cellular network data-communication radio control channel path to said control center, and means for associating the transmitted location alarm received at the control center with a phone pre-designated by the vehicle user; and means for calling the alarm from the control center to that phone.

9. The system of claim 6 wherein said user is a pedestrian or is located at another personal user location at which the user is provided with a personal cellular phone and said module.

10. The system of claim 6 wherein said associating of location data received over the cellular network data-communication radio control channel path with the voice call received over the cellular network radio voice-communication path is effected by PIN information means at the control center.

11. A method of voice and GPS satellite constellation positional location data radio communication over a cellular phone network having a cellular network radio voice-communication channel path communicating with a network operations control center and a cellular network different separate data-communication radio control channel path normally used to set up phone calls, break down phone calls and switch cell sites, each separately communicating with said network operations control center, the method comprising, user initial voice-calling of the control center from a portable cellular telephone location and over the cellular network radio voice-communication path, requesting user-location and other information services of the control center; upon user verification, sending a radio wake-up signal from the control center over the cellular network data-communication radio control channel path to be received at said location; providing a radio transponder and a GPS receiver adapted to receive GPS satellite constellation location data transmission frequency and a microprocessor module at said location; activating the GPS receiver in response to receipt of said radio wake-up signal sent from the cellular network control center over its data-communication radio control channel path, to receive and microprocessor-process location data received by the GPS receiver from the GPS satellite constellation at the user location and thereupon to activate the transponder at said user location to transmit the microprocessor-processed location data over the cellular network data-communication radio control channel path back to said control center; associating at the control center, the transmitted user-location data received over the cellular network data-communication radio control channel path by the control center, with the initial user voice call request received along the cellular network radio voice-communication path at the control center; and sending the requested location service information from the control center to the user.

12. The method of claim 11 wherein said location services information is sent from the control center over the cellular network radio voice-communication channel path to the user.

13. The method of claim 12 wherein said cellular network data-communication radio channel path uses a designated control channel path of the cellular voice phone network.

14. A system for voice and GPS satellite constellational positional location data radio communication over a cellular phone network having a cellular network radio voice-communication channel path communication with a network operations control center, the system having also a cellular network different separate data-communication radio control channel path normally used to set up phone calls, break down phone calls and switch cell sites, each separately communicating with the network operations control center, said system having, in combination, a portable cellular telephone for initial user voice-calling of the control center over the cellular network radio voice-communication path, for requesting user location and other information services; means at the control center and operable upon user identification, for sending a radio wake-up signal from the control center over the cellular network data-communication radio control channel path to be received at the user location; a radio-transponder, GPS receiver and microprocessor module disposed at said user location; means for activating the GPS receiver of the module in response to receipt of said radio wake-up signal sent from the control center over the cellular network data-communication radio control channel path, to receive and microprocessor-process location data received by the GPS receiver from the GPS satellite constellation and to activate the transponder at said user location to transmit the processed location data over the cellular network data-communication radio control channel path back to said control center; and means for sending location services information from the control center to the user upon associating the transmitted location data received over the cellular network data-communication radio control channel path by the control center with the initial user voice call request received along the cellular network radio voice-communication path by the control center.

15. The system of claim 14 wherein said location services information is sent from the control center over the cellular network radio voice-communication channel path to the user.

* * * * *